(12) United States Patent
Schweigert et al.

(10) Patent No.: US 8,566,054 B1
(45) Date of Patent: Oct. 22, 2013

(54) AIRCRAFT CONTROL SURFACE MEASUREMENT

(75) Inventors: Charlotte L. Schweigert, Port Ludlow, WA (US); Thomas J. Small, Renton, WA (US); John W. Porter, Renton, WA (US)

(73) Assignee: The Boeing Company, Chicago, IL (US)

( * ) Notice: Subject to any disclaimer, the term of this patent is extended or adjusted under 35 U.S.C. 154(b) by 938 days.

(21) Appl. No.: 12/622,808

(22) Filed: Nov. 20, 2009

(51) Int. Cl.
*G01D 18/00* (2006.01)

(52) U.S. Cl.
USPC ............. 702/87; 702/144; 702/150; 702/158

(58) Field of Classification Search
USPC .......... 702/87, 144, 150, 158; 416/23, 25, 31; 342/410; 244/212, 217, 225, 234
See application file for complete search history.

(56) References Cited

U.S. PATENT DOCUMENTS

| | | | |
|---|---|---|---|
| 5,564,655 | A | 10/1996 | Garland et al. |
| 6,802,238 | B1 * | 10/2004 | Sanderson ................... 89/37.16 |
| 6,855,099 | B2 * | 2/2005 | Hazlehurst et al. ............. 483/38 |
| 6,880,258 | B2 | 4/2005 | Adams et al. |
| 7,793,890 | B2 * | 9/2010 | Scherer ........................ 244/190 |
| 2009/0092004 | A1 * | 4/2009 | Toennessen .................... 367/17 |

FOREIGN PATENT DOCUMENTS

WO 8401426 4/1984

OTHER PUBLICATIONS

"ASI DATAMYTE Releases QDA 8.5 M9", Plymouth, MN, Aug. 6, 2009, 1 page www.asidatamyte.com/en/news/News-Releases/.
"Error-Proof Off the Line", ASI DATAMYTE Data Collection Quality Solutions, 1 page www.asidatamyte.com/en/solutions/assembly/data-collection[Feb. 9, 2010].
"A Sampling of Inspect User Case Studies", ASI DataMyte, pp. 1-3, retrieved Feb. 2010 www.asidatamyte.com.

* cited by examiner

*Primary Examiner* — Elias Desta
(74) *Attorney, Agent, or Firm* — Yee & Associates, P.C.

(57) ABSTRACT

Embodiments of the present disclosure provide an apparatus and method for managing an orientation of a tab of a control surface of an aircraft comprising an elongate structure having a number of members configured to position the elongate structure to a control surface, a bracket located on the elongate structure, a plurality of indicators located along the elongate structure, and a data processor in communication with the plurality of indicators. The bracket may be positioned against an edge of a tab of the control surface. Each of the plurality of indicators may be configured to generate a number of measurements about an orientation of the tab on the control surface. The data processor may be configured to present information about the orientation of the tab on the control surface.

20 Claims, 9 Drawing Sheets

AIRCRAFT CONTROL SURFACE MEASUREMENT

BACKGROUND INFORMATION

1. Field

The present disclosure relates generally to aircraft and, in particular, to a method and apparatus for calibrating a control surface of the aircraft. Still more particularly, the present disclosure relates to a method and apparatus for setting a balance tab of the control surface.

2. Background

In flight, an aircraft will rotate about its center of gravity, a point which may be the average location of the mass of the aircraft. A three dimensional coordinate system may be defined through the center of gravity with each axis of the coordinate system perpendicular to the other two axes. The orientation of the aircraft may be the amount of rotation of the parts of the aircraft along the axes. The roll axis may lie along the length of the aircraft.

A roll motion may be caused by the deflection of the ailerons of the aircraft. The aileron may be a hinged section of a wing at the rear of each wing. The rear of each wing may be the trailing edge of each wing. The trailing edge of each wing may be the edge towards the aft of the aircraft. The ailerons work in opposition; when the right aileron goes in one direction, the left aileron goes in the opposite direction. Changing the angle of deflection at the rear of a wing will change the amount of lift generated by the wing. With greater downward deflection, the lift will increase in the upward direction; with greater upward deflection, the lift will decrease in the upward direction. Since the ailerons work in pairs, the lift on one wing increases as the lift on the opposite wing decreases. Because the forces are not equal, there may be torque about the center of gravity and the aircraft rotates about the roll axis. The pilot may use the torque about the center of gravity to turn the aircraft.

Additionally, a tab may be part of each aileron. The "tab" may also be referred to as a "balance tab." The tab may be a hinged section of the aileron at the rear of each aileron. The rear of each aileron may be the trailing edge of each aileron. The trailing edge of each aileron may be the edge towards the aft of the aircraft. The tab may or may not be the entire length of the aileron. The tabs may move opposite to the direction of aileron movement to assist in positioning the aileron aerodynamically.

Rigging or adjustment of the aileron and tab may be performed during, and/or after, the initial assembly of the aircraft, as well as during maintenance and routine checkups. Flight testing and configuration may be performed after the initial assembly. During flight testing and configuration, the ailerons and tabs are adjusted to produce the desired aerodynamic effect. The adjustments are made before the first test flight is performed to check the accuracy of the adjustments. If the test flight results show unacceptable aileron positioning characteristics, more adjustments and test flights may be performed.

Therefore, it would be advantageous to have a method and apparatus that takes into account one or more of the issues discussed above.

SUMMARY

An advantageous embodiment discloses an elongate structure having a number of members configured to position the elongate structure to a control surface, a plurality of indicators located along the elongate structure, and a data processor in communication with the plurality of indicators. Each of the plurality of indicators may be configured to generate data about an orientation of a tab of the control surface. The data processor may be configured to present the information about the orientation of the tab of the control surface.

Another advantageous embodiment discloses an apparatus comprising an elongate structure having a number of members configured to position the elongate structure to a control surface, a bracket located on the elongate structure, a plurality of indicators located along the elongate structure, and a data processor in communication with the plurality of indicators. The bracket may be positioned against an edge of a tab of the control surface. Each of the plurality of indicators may be configured to generate a number of measurements about an orientation of the tab on the control surface. The data processor may be configured to present information about the orientation of the tab on the control surface.

Yet another advantageous embodiment discloses a method for managing an orientation of a tab. The process begins by positioning an elongate structure with a number of members against a control surface. The process then generates data about an orientation of the tab of the control surface. The process then identifies information about the orientation of the tab of the control surface using the data. The process then presents the information about the orientation of the tab of the control surface.

The features, functions, and advantages can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
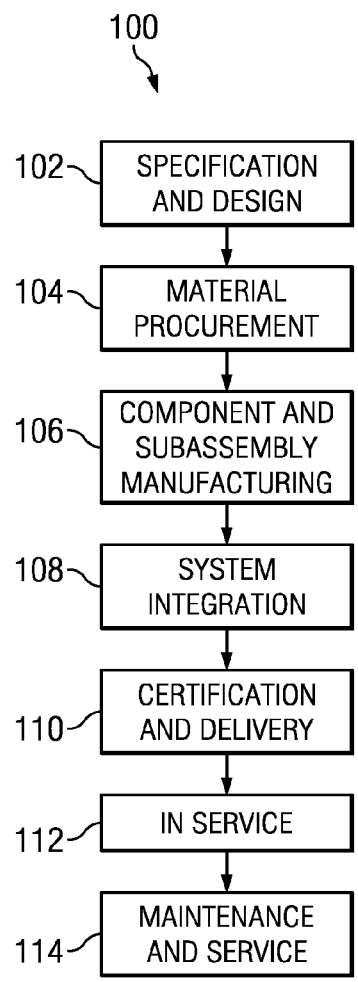
FIG. 1 is an illustration of an aircraft manufacturing and service method in accordance with an advantageous embodiment.
Figure 2:
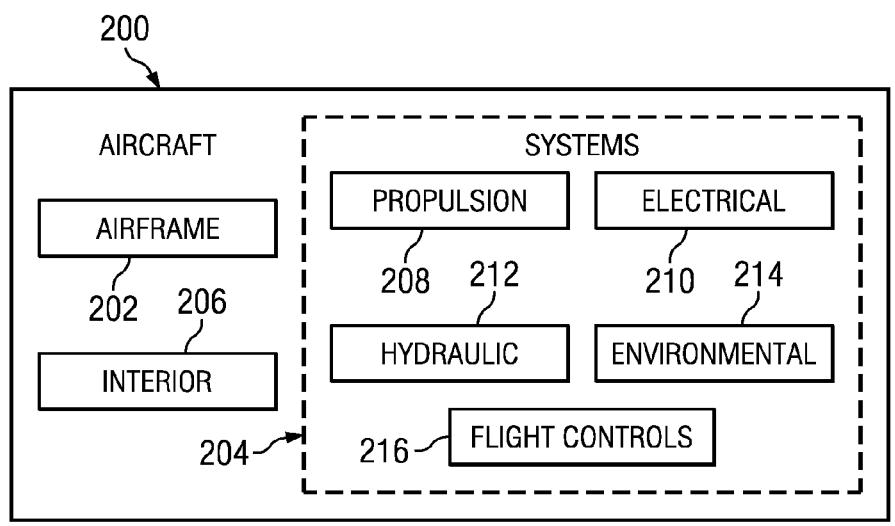
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion 208, electrical 210, hydraulic 212, and environmental 214, and flight controls 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used, and only one of each item in the list may be needed. For example, "at least one of item A, item B, and item C" may include, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

The different advantageous embodiments recognize and take into account a number of considerations. For example, the different advantageous embodiments recognize and take into account that with a current solution to measuring the inaccuracies in the wing is using a six inch scale. The aileron is positioned relative to the fixed portion of the wing using a six inch scale. After the aileron is adjusted, the tab is adjusted based on the aileron. To do this, the six inch scale is used to measure the distance between the aft corner of the tab and the adjacent corner of the aileron. The term "tab" may also be referred to as an "aileron tab" or a "balance tab." The different advantageous embodiments recognize that using a six inch scale to measure the angle difference in the aileron compared to a fixed portion of the wing and then using the scale to measure the difference between the tab and the aileron may cause inconsistencies and is inaccurate. The inconsistencies and inaccuracies may cause the aircraft to undergo multiple test flights to correct the tabs so that they provide the desired aerodynamic effect. The desired aerodynamic effect may be a neutral amount of lift between opposing control surfaces.

Figure 3:
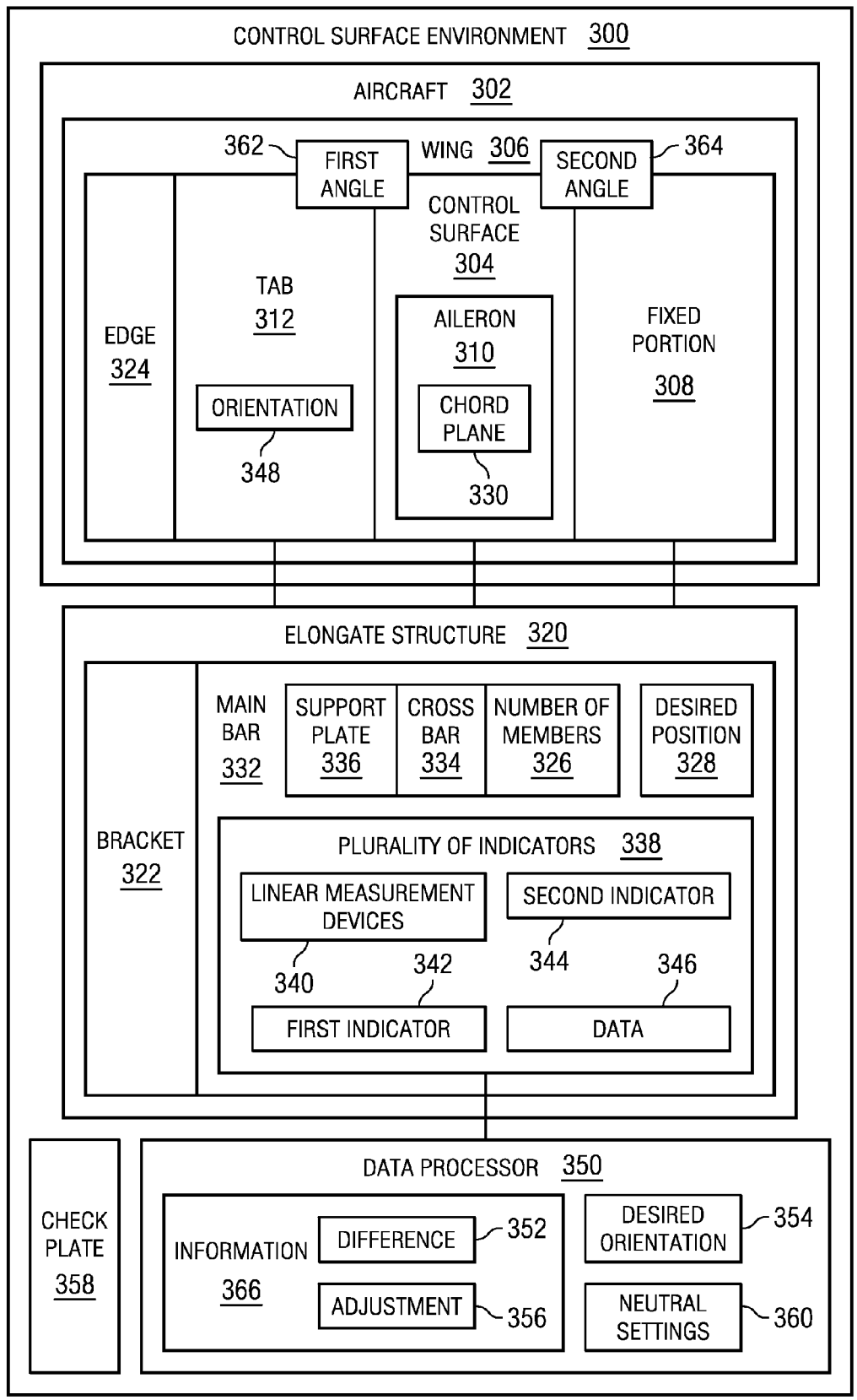
FIG. 3 is an illustration of a block diagram of a control surface environment in which an advantageous embodiment may be implemented.

Turning now to FIG. 3, an illustration of a block diagram of a control surface environment is depicted in accordance with an advantageous embodiment. Control surface environment 300 may be implemented along with airframe 202 illustrated in FIG. 2. Control surface environment 300 may be manipulated by flight controls, such as flight controls 216 of FIG. 2. Control surface environment 300 may comprise aircraft 302. Aircraft 302 may be one implementation of one example of aircraft 200 of FIG. 2. Aircraft 302 may have control surfaces, such as control surface 304. Control surface 304 allows a pilot to adjust and control the attitude and orientation of aircraft 302. Control surface 304 may be, but not limited to, a wing, aileron, flap, stabilizer, elevator, slat, rudder, and/or trim. Control surface 304 may be aileron 310 of wing 306. Wing 306 may be part of an airframe of aircraft 302, such as airframe 202 as shown in FIG. 2. Wing 306 may provide lift to aircraft 302.

Wing 306 may comprise fixed portion 308, aileron 310, and tab 312. Fixed portion 308 may be any part of wing 306 structurally connected to the body of the aircraft 302 such as airframe 202 as shown in FIG. 2. Fixed portion 308 may also be the part of wing 306 that is fixed and non-moveable relative to the body of aircraft 302. Aileron 310 may be used to control the aircraft in a roll direction. Aileron 310 moves in a direction relative to wing 306 to provide deflection of air passing past wing 306. Changing the angle of deflection at the rear of wing 306 will change the amount of lift generated by wing 306. For example, aileron 310 moves in an upward or downward direction to either decrease lift on aircraft 302 or increase lift on aircraft 302, respectively. Aileron 310 may be part of wing 306 at the trailing edge of wing 306. The trailing edge is the edge towards the aft of aircraft 302. Tab 312 may be used to assist in positioning the aileron 310 aerodynamically. Tab 312 may move in an opposite direction of aileron 310.

Control surface environment 300 may also comprise elongate structure 320. Elongate structure 320 may comprise main bar 332, cross bar 334, plurality of indicators 338, bracket 322, and support plate 336. Elongate structure 320 may be used to adjust tab 312. Elongate structure may be made of materials that maintain a rigid shape, such as, but not limited to, a hard plastic and/or a metal. Elongate structure 320 may also be referred to as an aileron tab rigging fixture. Elongate structure 320 may be positioned on wing 306 by placing bracket 322 of elongate structure 320 on edge 324 of tab 312 so that bracket 322 may be flush against edge 324 of tab 312. Bracket 322 of elongate structure 320 may be in the shape of an "L" or "T" and allows elongate structure 320 to be positioned perpendicular to edge 324 of tab 312. In one or more advantageous embodiments, elongate structure 320 may be positioned on the underneath side of wing 306. In other advantageous embodiments, elongate structure 320 may be positioned in other orientation against wing 306 or control surface 304 using a differently shaped bracket. Additionally, elongate structure 320 may be positioned a desired distance from a corner of tab 312 of control surface 304. The desired distance may be 34.4 inches from the inward corner of tab 312 of control surface 304. The inward corner of tab 312 of control surface 304 may be defined as the corner closest to the main body of aircraft 302. The desired distance may be marked along edge 324 of tab 312. In other advantageous embodiments, the desired distance may be in other places along tab 312 or may be a distance from some other component.

Number of members 326 of elongate structure 320 may be positioned on aileron 310. Number of members 326 may be configured to position elongate structure 320 in desired position 328 relative to chord plane 330 of aileron 310 of wing 306. Chord plane 330 may be defined as the plane dividing aileron 310 of wing 306 in half lengthwise. Number of members 326 may be positioned on aileron 310 of wing 306. Desired position 328 may be a plane relative to chord plane 330. Desired position 328 may be any position an operator desires.

Elongate structure 320 may also comprise main bar 332. Main bar 332 has cross bar 334 attached in a position perpendicular to main bar 332. Support plate 336 strengthens the connection of main bar 332 and cross bar 334. Number of members 326 may be located on main bar 332 and cross bar 334. Number of members 326 may be placed in any position along the two bars 332 and 334 as long as the position allows the number of members 326 to be located on aileron 310 when in use and so that number of members 326 creates a desired position 328 for elongate structure 320 to reside relative to chord plane 330 of aileron 310 of wing 306.

Elongate structure 320 may comprise plurality of indicators 338. Plurality of indicators 338 may measure distances linearly. Plurality of indicators 338 may be linear measurement devices 340, such as, for example, linear transducers. Plurality of indicators 338 may measure a distance from neutral settings 360. Plurality of indicators 338 of elongate structure 320 may comprise first indicator 342 and second indicator 344. First indicator 342 may be positioned on tab 312 of control surface 304 and second indicator 344 may be positioned on fixed portion 308 of wing 306. Plurality of indicators 338 may be configured to generate data 346 about tab 312, aileron 310, and fixed portion 308 of wing 306. Data 346 may comprise distance measurements to objects, such as the distance from tab 312 to neutral settings 360 and fixed portion 308 of wing 306 to neutral settings 360.

In these illustrative examples, control surface environment 300 also comprises check plate 358. Check plate 358 may be any type of material that is designed to configure neutral settings 360. Neutral settings 360 may be settings for desired position 328. Check plate 358 uses each one of plurality of indicators 338 and number of members 326 to adjust neutral settings 360. Neutral settings 360 may be retained in data processor 350. Neutral settings 360 may be used by data processor 350 so that data processor 350 may identify angles 362 and 364.

Data processor 350 may be configured to identify first angle 362 between tab 312 and control surface 304 using distance measurements of the distances between neutral settings 360 and tab 312 received from plurality of indicators 338. Data processor 350 may also be configured to identify second angle 364 between control surface 304 and fixed portion 308 of wing 306 using distance measurements of the distances between neutral settings 360 and fixed portion 308 of wing 306 received from plurality of indicators 338.

Data processor 350 may be configured to identify information 366 about orientation 348 of tab 312 of control surface 304 using first angle 362 and second angle 364. Information 366 may comprise difference 352 and adjustments 356.

Data processor 350 receives data 346 and identifies difference 352 between orientation 348 of tab 312 and desired orientation 354 of tab 312 of control surface 304. Data processor 350 also identifies, using data 346, adjustment 356 to make orientation 348 of tab 312 so that tab 312 is moved to the desired orientation 354. Desired orientation 354 may be an orientation that an operator desires and/or one which results in certain handling characteristics. The certain handling characteristics may be characteristics resulting in acceptable forces a pilot may feel for the pilot to move the controls. The certain handling characteristics may result in other properties of the aircraft.

Figure 4:
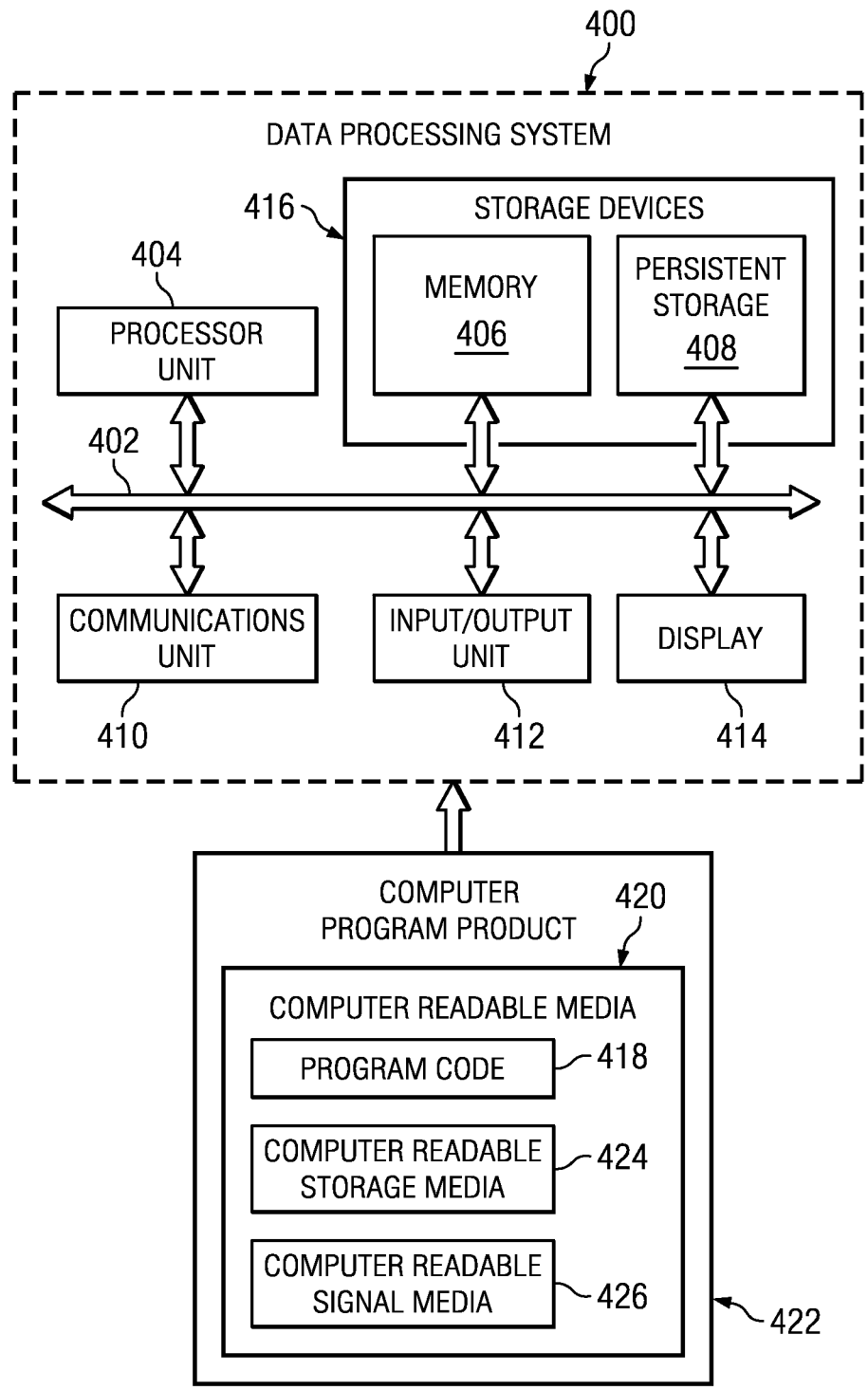
FIG. 4 is an illustration of a data processing system depicted in accordance with an illustrative embodiment.

Turning now to FIG. 4, a diagram of a data processing system is depicted in accordance with an illustrative embodiment. In this illustrative example, data processing system 400 includes communications fabric 402, which provides communications between processor unit 404, memory 406, persistent storage 408, communications unit 410, input/output (I/O) unit 412, and display 414. Data processing system 400 may be one example of one implementation of data processor 350 of FIG. 3.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory, or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426. Computer readable storage media 424 may include, for example, an optical or magnetic disc that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
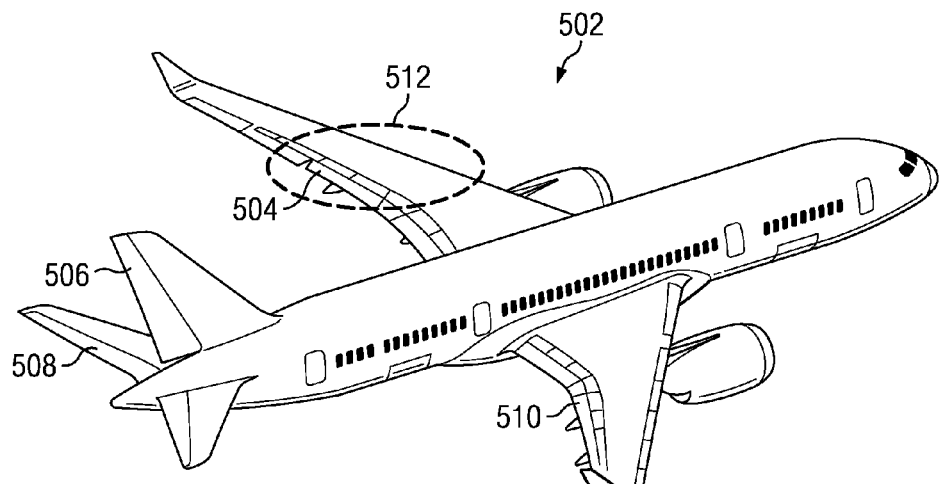
FIG. 5 is an illustration of an aircraft depicted in accordance with an advantageous embodiment.

Turning now to FIG. 5, an illustration of an aircraft is depicted in accordance with an advantageous embodiment. Aircraft 502 may be one example of one implementation of aircraft 302 of FIG. 3. Aircraft 502 may comprise different types of control surfaces, such as control surfaces 504, 506, 508, and 510. Control surfaces 504, 506, 508, and 510 may be one example of one implementation of control surface 304 as shown in FIG. 3. Aircraft 502 also comprises section 512. Section 512 is an area where a control surface environment, such as control surface environment 300 of FIG. 3, may be implemented.

Figure 6:
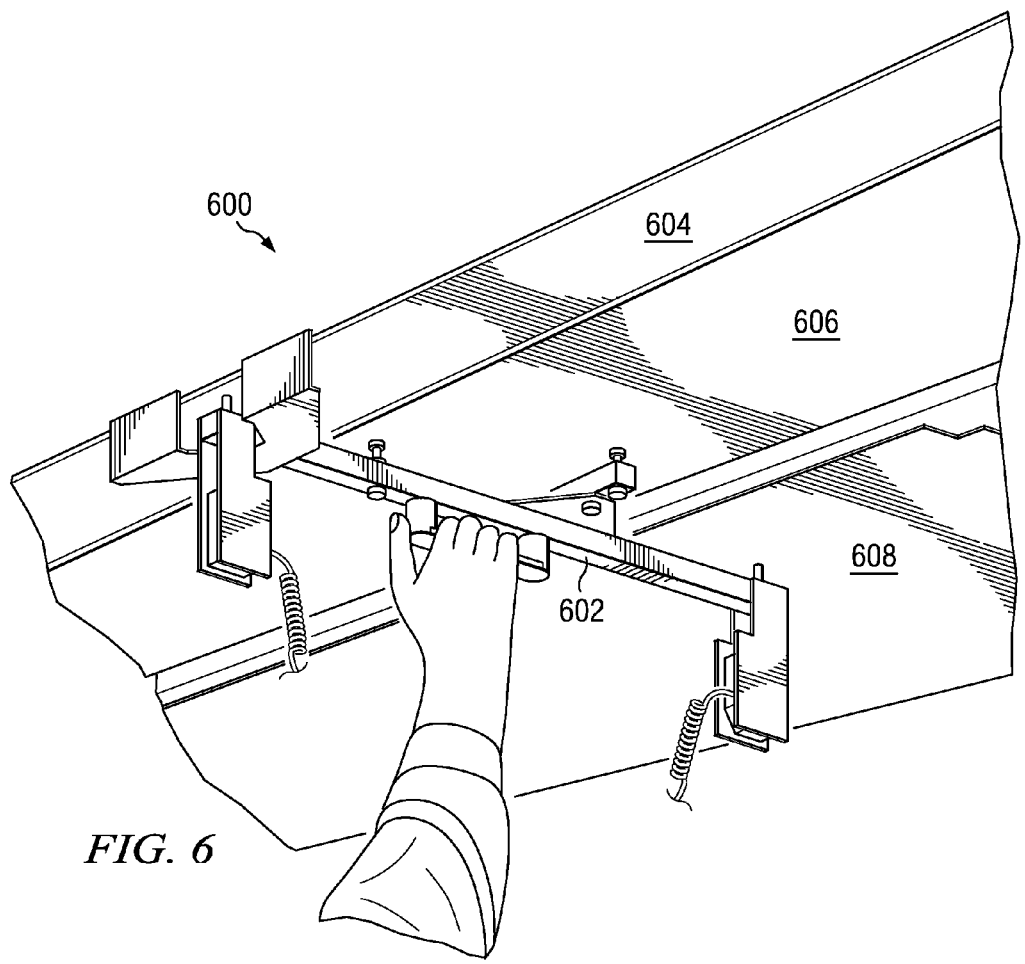
FIG. 6 is an illustration of a perspective view of an elongate structure in use depicted in accordance with an advantageous embodiment.

Turning now to FIG. 6, an illustration of a perspective view of an elongate structure in use is depicted in accordance with an advantageous embodiment. Control surface environment 600 may be one implementation of one example of control surface environment 300 as shown in FIG. 3. Control surface environment 600 comprises elongate structure 602. Elongate structure 602 may be one implementation of one example of elongate structure 320 of FIG. 3. Elongate structure 602 is placed on tab 604, aileron 606, and fixed portion 608.

Figure 7:
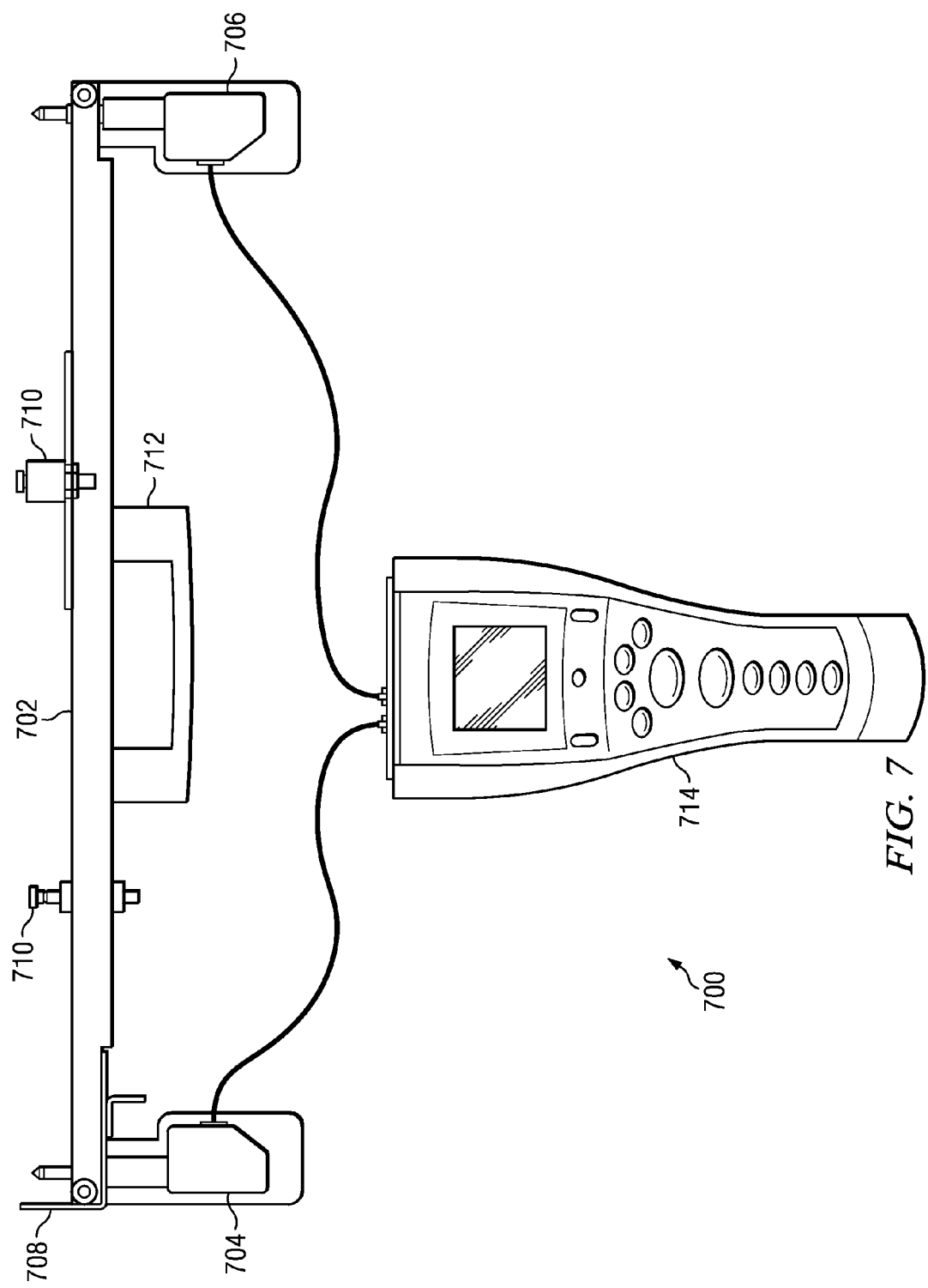
FIG. 7 is an illustration of a side view of an elongate structure with a data collector depicted in accordance with an advantageous embodiment.

Turning now to FIG. 7, an illustration of a side view of an elongate structure with a data collector is depicted in accordance with an advantageous embodiment. Control surface environment 700 is an example of one implementation of control surface environment 300 in FIG. 3. In this example, control surface environment 700 comprises elongate structure 700 and data processor 714. Elongate structure 700 may be one implementation of one example of elongate structure 320 of FIG. 3. Elongate structure may be placed on an aileron, such as aileron 606 as shown in FIG. 6.

Elongate structure 700 comprises main bar 702. Main bar 702 connects linear transducers 704 and 706. Linear transducers 704 and 706 may be one implementation of one example of plurality of indicators 338 as shown in FIG. 3. Elongate structure 700 comprises bracket 708. Bracket 708 may be one implementation of one example of bracket 322 as shown in FIG. 3.

Elongate structure 700 also comprises members 710. Members 710 may reside in main bar 702 and/or a cross bar. Members may be one implementation of one example of number of members 326 as shown in FIG. 3. Elongate structure 700 also comprises handle 712. Handle 712 may be used for positioning elongate structure 700 against a wing of an aircraft.

Data processor 714 is connected to linear transducers 704 and 706. Data processor 714 may be one implementation of one example of data processor 350 as shown in FIG. 3. Data processor 714 may be one implementation of one example of data processing system 400 as shown in FIG. 4. Data processor 714 may comprise a processor unit, such as processor unit 404 of FIG. 4, to identify angles, differences in orientation, and adjustments.

Figure 8:
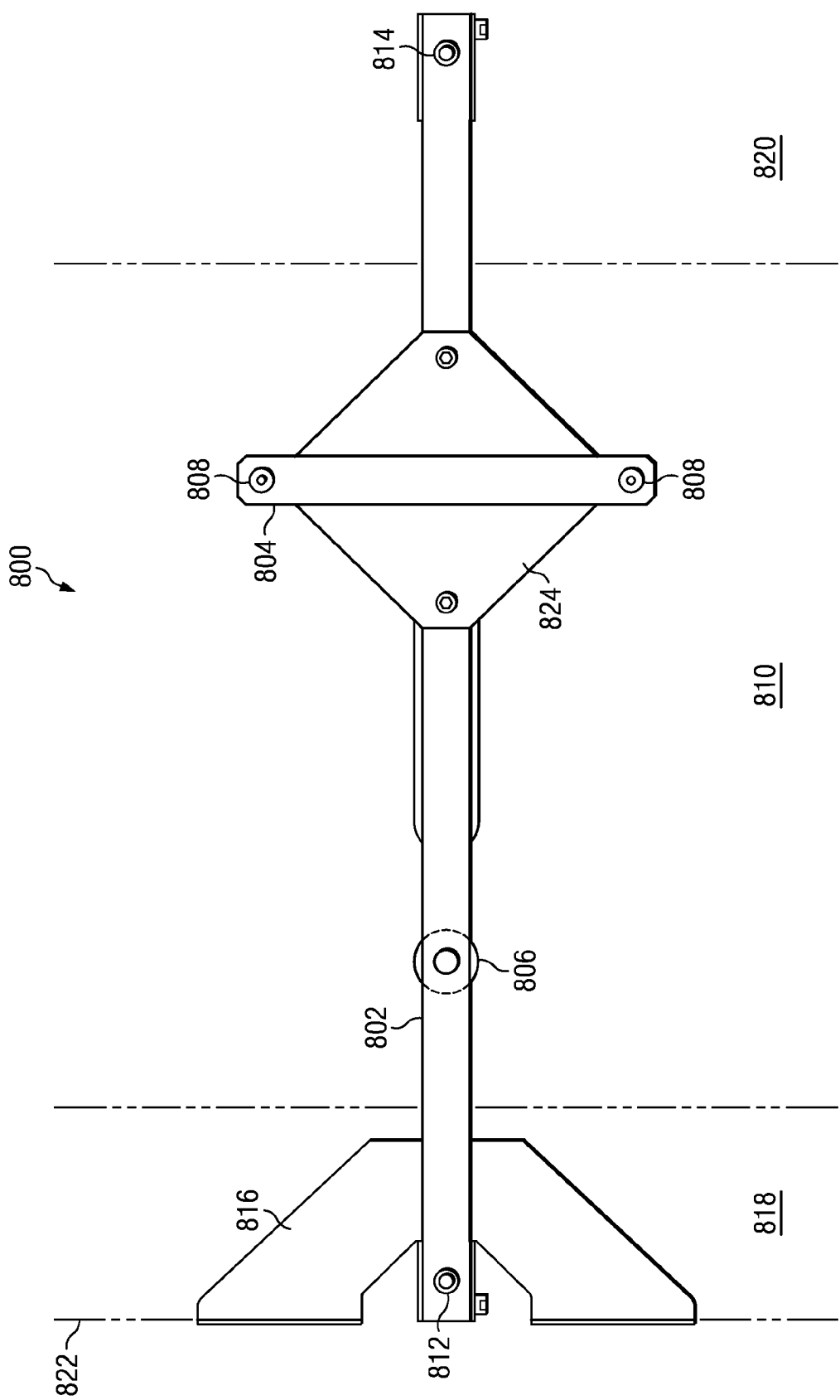
FIG. 8 is an illustration of a top view of an elongate structure depicted in accordance with an advantageous embodiment.

Turning now to FIG. 8, an illustration of a top view of an elongate structure depicted in accordance with an advantageous embodiment. Elongate structure 800 may be an aileron tab rigging structure. Elongate structure 800 may be one implementation of one example of elongate structure 320 of FIG. 3.

Elongate structure 800 comprises main bar 802. Main bar 802 is connected to cross bar 804. Positioning members 806 and 808 reside on main bar 802 and cross bar 804. Positioning members 806 and 808 are placed on aileron 810. Linear transducers 812 and 814 are located at each end of elongate structure 800. Bracket 816 is located at the same end of elongate structure 800 as linear transducer 812. Linear transducer 812 is placed on tab 818 and linear transducer 814 is placed on fixed portion 820 of a wing during operation of elongate structure 800. Bracket 816 is placed along edge 822 of tab 818. Support plate 824 may be used to provide support for the connection of main bar 802 and cross bar 804.

Figure 9:
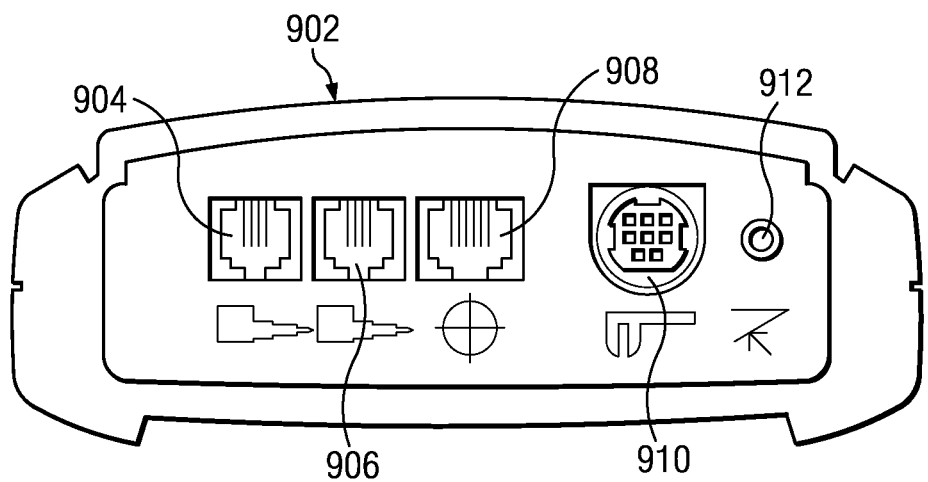
FIG. 9 is an illustration of a view of data processor inputs depicted in accordance with an advantageous embodiment.

Turning now to FIG. 9, an illustration of a view of data processor inputs is depicted in accordance with an advantageous embodiment. Data collector 902 may be one implementation of one example of data processor 350 as shown in FIG. 3. Data collector 902 may comprise inputs 904, 906, 908, and 910. Inputs 904 and 906 may be connected to linear transducers, such as linear transducers 342 and 344 as shown in FIG. 3. Ports 908, 910, and 912 may be used for other purposes.

Figure 10:
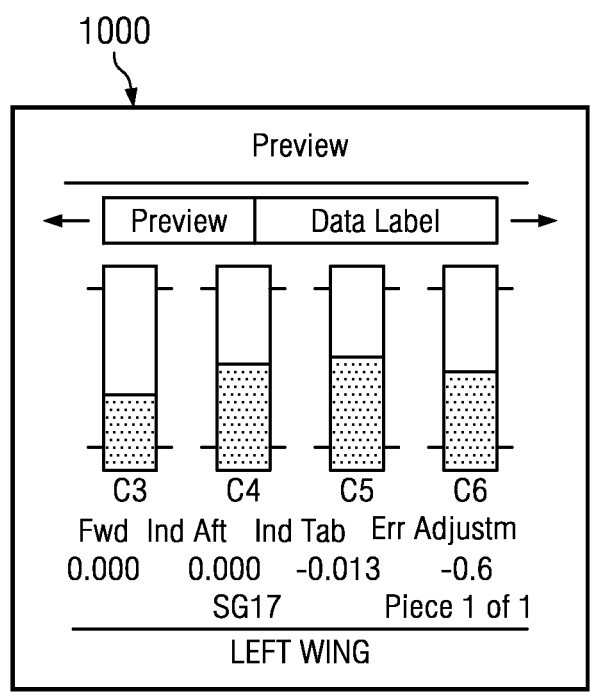
FIG. 10 is an illustration of a view of a display of a data processor depicted in accordance with an advantageous embodiment.

Turning now to FIG. 10, an illustration of a view of a display of a data processor is depicted in accordance with an advantageous embodiment. Data processor display 1000 may be one implementation of one example of a display of data processor 350 as shown in FIG. 3. Data processor display 1000 may be one implementation of one example of display 414 as shown in FIG. 4.

Figure 11:
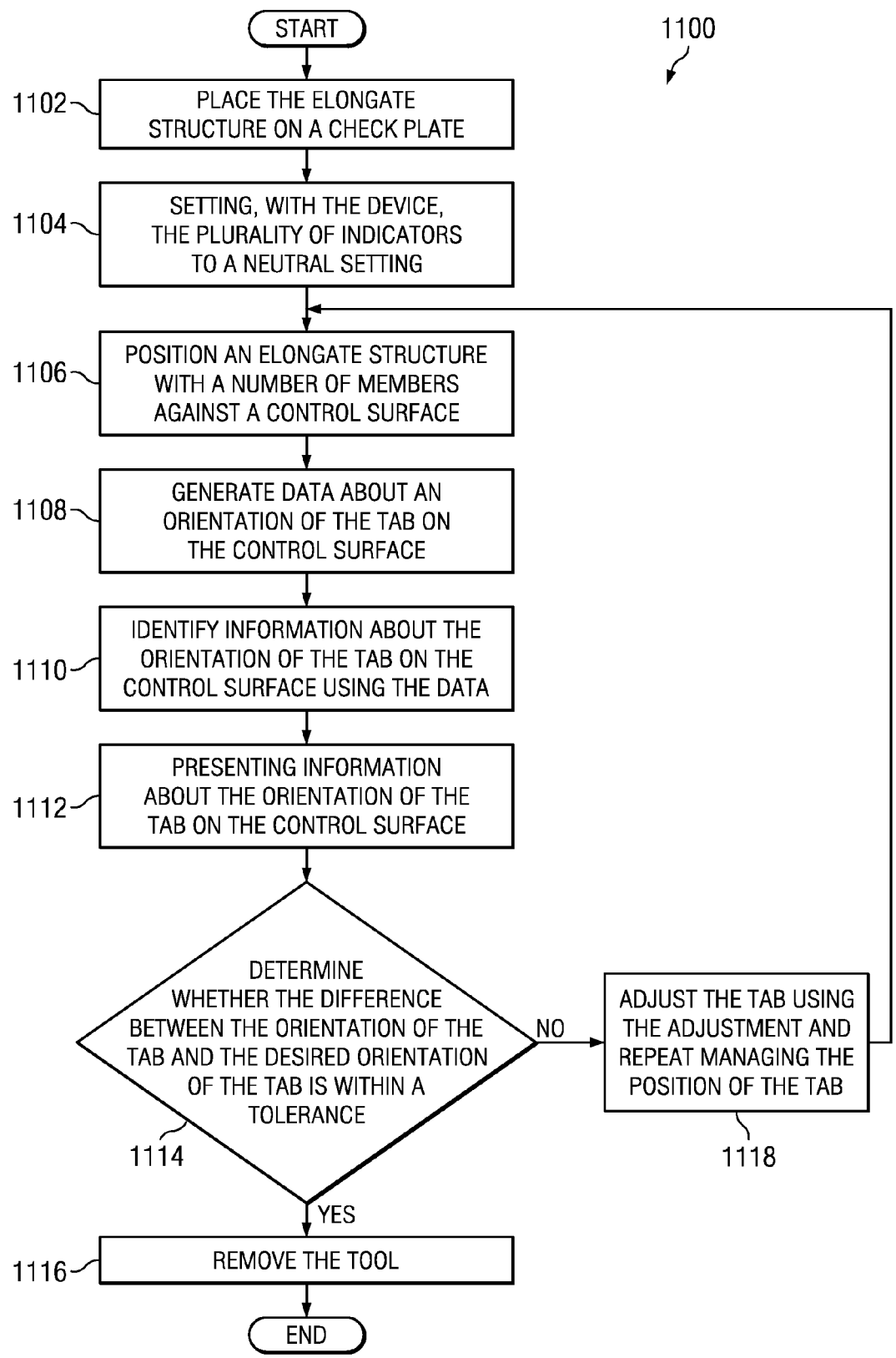
FIG. 11 is an illustration of a flowchart of a process for managing a tab in accordance with an advantageous embodiment.

FIG. 11 is an illustration of a flowchart of a process for managing a tab in accordance with an advantageous embodiment. The process is generally designated by reference number 1100, and may be implemented in a control surface environment, such as control surface environment 300 illustrated in FIG. 3.

The process may begin by placing an elongate structure on a check plate (operation 1102). Then, with a data processor, setting a plurality of indicators to a neutral setting (operation 1104). Then, the elongate structure may be positioned with a number of members against a control surface (operation 1106). The plurality of indicators generates data about an orientation of the tab on the control surface (operation 1108). The data processor identifies information about the orientation of the tab on the control surface using the data (operation 1110). The data processor presents the information about the orientation of the tab of the control surface (operation 1112). A determination is made whether a difference between an orientation of the tab and a desired orientation of the tab is within a tolerance (operation 1114). If the difference between an orientation of the tab and a desired orientation of the tab is within a tolerance, the tool is removed and the process terminates thereafter (operation 1116). If the difference between an orientation of the tab and a desired orientation of the tab is not within the tolerance, the tab is adjusted and the process returns to operation 1106 (operation 1118).

Figure 12:
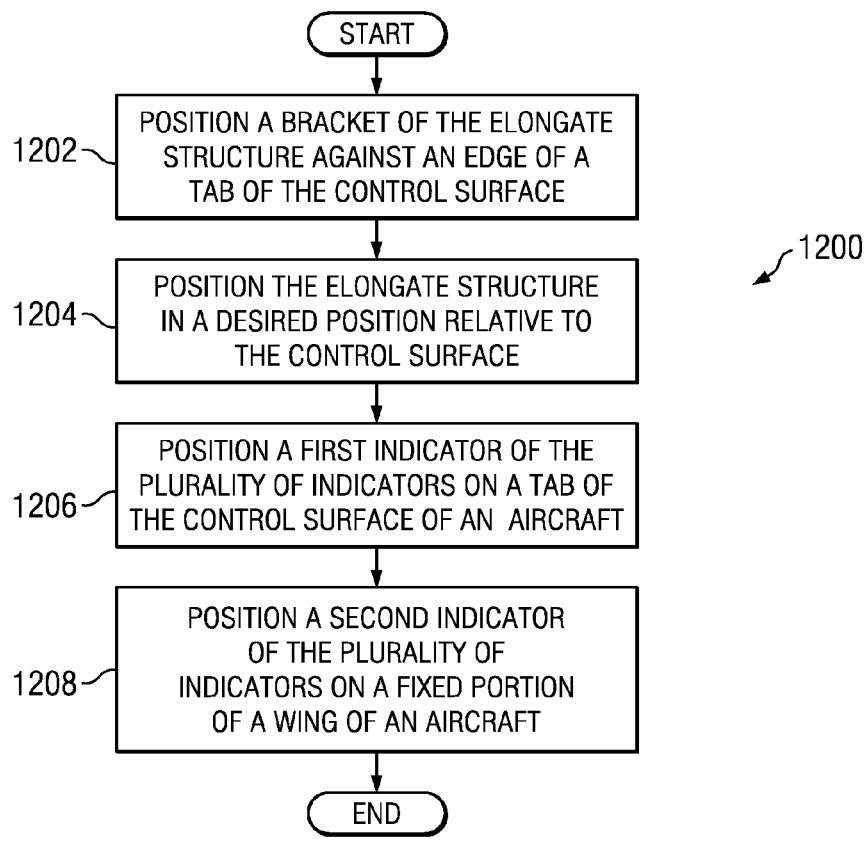
FIG. 12 is an illustration of a flowchart of a process for positioning an elongate structure with a number of members in accordance with an advantageous embodiment.

FIG. 12 is an illustration of a flowchart of a process for positioning an elongate structure with a number of members in accordance with an advantageous embodiment. The process is generally designated by reference number 1200, and may be implemented in a control surface environment, such as control surface environment 300 illustrated in FIG. 3.

The process may begin by positioning a bracket of an elongate structure against an edge of a tab of a control surface (operation 1202). Also, positioning the elongate structure in a desired position relative to the control surface (operation 1204). The number of members is positioned against the control surface. Also, positioning a first indicator of the plurality of indicators on a tab of the control surface of an aircraft (operation 1206). Also, positioning a second indicator of the plurality of indicators on a fixed portion of a wing of an aircraft (operation 1208).

Figure 13:
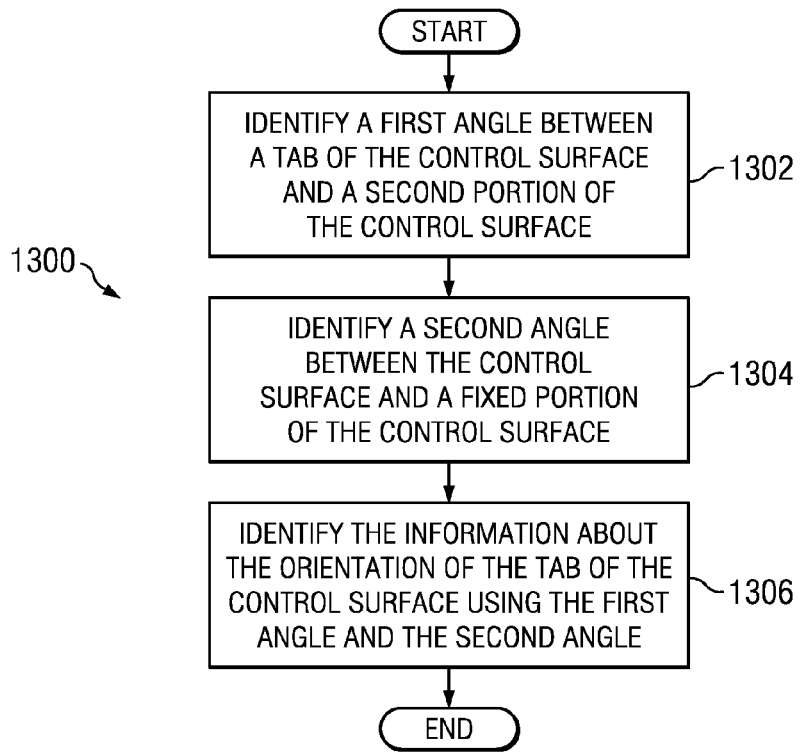
FIG. 13 is an illustration of a flowchart of a process for identifying information about the orientation of the tab on a control surface using data in accordance with an advantageous embodiment.

FIG. 13 is an illustration of a flowchart of a process for identifying information about the orientation of the tab on a control surface using data in accordance with an advantageous embodiment. The process is generally designated by reference number 1300, and may be implemented in a control surface environment, such as control surface environment 300 illustrated in FIG. 3.

The process may begin by the data processor identifying a first angle between a tab of the control surface and the control surface (operation 1302). Also, the data processor identifies a second angle between the control surface and a fixed portion of a wing (operation 1304). Also, the data processor identifies the information about the orientation of the tab on the control surface using the first angle and the second angle (operation 1306). Operation 1302 and 1304 may occur simultaneously. The data processor may use the data from the plurality of indicators to identify the first and second angles. The data may be a number of linear measurements. The number of linear measurements may be different from a neutral setting for the plurality of indicators. The information may comprise a difference between the orientation of the tab and a desired orientation of the tab. The information may also comprise an adjustment to correct the orientation to the desired orientation using the difference.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, first indicator 342 may be located on second indicator 344 or bracket 322 of FIG. 3. As another example, number of members 326 may be located on other parts of elongate structure 320 other than cross bar 334 and main bar 332 of FIG. 3. Also, for example, steps 802 and 804 of FIG. 8 may be skipped. Also, for example, steps 802 and 804 of FIG. 8 may be replaced by another type of calibration used to find a difference between different sets of angles.

Embodiments of the present disclosure provide an apparatus and method for managing an orientation of a tab of a control surface of an aircraft comprising an elongate structure having a number of members configured to position the elongate structure to a control surface, a bracket located on the elongate structure, a plurality of indicators located along the elongate structure, and a data processor in communication with the plurality of indicators. The bracket may be positioned against an edge of a tab of the control surface. Each of the plurality of indicators may be configured to generate a number of measurements about an orientation of the tab on the control surface. The data processor may be configured to present information about the orientation of the tab on the control surface.

In one or more advantageous embodiments, the ability to accurately measure and adjust a balance tab is provided. Further, the different advantageous embodiments also recognize that current solutions provide inaccurate results. As a result, current solutions require more test flights which increase costs. The different advantageous embodiments provide for identifying an angle between a tab and an aileron simultaneously while identifying an angle between the aileron and a fixed portion of a wing. The different advantageous embodiments also recognize that identifying the angles simultaneously allows for a composite angle between the tab and the fixed portion to be identified. Further, the different advantageous embodiments also recognize that current solutions produce inaccurate results by measuring each of the two angles separately.

Although the different advantageous embodiments have been described with respect to parts for aircraft, other advantageous embodiments may be applied to parts for other types of vehicles. For example, without limitation, other advantageous embodiments may be applied to other vehicles which have a need to measure angles between components.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, the apparatus comprising:
   an elongate structure having a number of members configured to position the elongate structure to a control surface, such that the control surface is attached to a fixed surface and moveable relative to the fixed surface;
   a plurality of indicators located along the elongate structure, each of the plurality of indicators being configured to generate data about an orientation of a tab of the control surface; and
   a data processor in communication with the plurality of indicators, the data processor is configured to present information about the orientation of the tab of the control surface, wherein the information comprises a difference between the orientation of the tab and a desired orientation, and wherein the information also comprises an adjustment to correct the orientation to the desired orientation using the difference.

2. The apparatus of claim 1, wherein the control surface is an aileron.

3. The apparatus of claim 1, wherein the elongate structure further comprises a bracket, wherein the bracket is configured to be positioned against an edge of the tab of the control surface.

4. The apparatus of claim 1, wherein the indicators are linear measurement devices.

5. The apparatus of claim 1, wherein the number of members are configured to position the elongate structure in a desired position relative to the control surface, and wherein the number of members are positioned on the control surface.

6. The apparatus of claim 5, wherein the desired position is relative to a chord plane of the control surface.

7. The apparatus of claim 1, wherein a first indicator of the plurality of indicators is positioned on the tab of the control surface, and wherein a second indicator of the plurality of indicators is positioned on a fixed portion of a wing.

8. The apparatus of claim 1, wherein the data is a number of linear measurements.

9. The apparatus of claim 1, wherein the data processor is configured to receive the data, identify a first angle between the tab of the control surface and the control surface, identify a second angle between the control surface and a fixed portion of a wing, and identify the information about the orientation of the tab of the control surface using the first angle and the second angle.

10. A method of managing an orientation of a tab of a control surface, the method comprising:
    calibrating an elongate structure, wherein the elongate structure is a rigging fixture;
    positioning the elongate structure against the control surface, such that the control surface is attached to a fixed surface and moveable relative to the fixed surface, such that the elongate structure comprises: a number of members, and a plurality of indicators located along the elongate structure, each of the plurality of indicators configured to generate a number of measurements about the orientation of the tab of the control surface;
    generating data, using a hardware processor, about the orientation of the tab of the control surface;
    identifying information, using the hardware processor, about the orientation of the tab of the control surface using the data; and
    presenting, on a display, the information about the orientation of the tab of the control surface.

11. The method of claim 10, wherein calibrating the elongate structure further comprises:
    placing the elongate structure on a check plate; and
    setting, using the hardware processor, the plurality of indicators to a neutral setting.

12. The method of claim 10, wherein the data is a number of linear measurements.

13. The method of claim 10, wherein the information comprises a difference between the orientation of the tab and a desired orientation, and wherein the information also comprises an adjustment to correct the orientation to the desired orientation using the difference.

14. The method of claim 10, wherein identifying the information about the orientation of the tab of the control surface using the data further comprises:
   identifying a first angle between the tab of the control surface and the control surface;
   identifying a second angle between the control surface and a fixed portion of a wing; and
   identifying the information about the orientation of the tab of the control surface using the first angle and the second angle.

15. The method of claim 10, wherein the control surface is an aileron.

16. The method of claim 10, wherein positioning, against the control surface, the elongate structure with the number of members further comprises:
   positioning a bracket, of the elongate structure, against an edge of the tab of the control surface.

17. The method of claim 10, wherein positioning, against the control surface, the elongate structure with the number of members further comprises:
   positioning the elongate structure in a desired position relative to the control surface, and wherein the number of members are positioned against the control surface.

18. The method of claim 17, wherein the desired position is relative to a chord plane of the control surface.

19. The method of claim 14, wherein positioning, against the control surface, the elongate structure with the number of members further comprises:
   positioning a first indicator of the plurality of indicators on the tab of the control surface; and
   positioning a second indicator of the plurality of indicators on the fixed portion of the wing.

20. The method of claim 13 further comprising:
   determining whether the difference between the orientation of the tab of the control surface and the desired orientation of the tab of the control surface is within a tolerance;
   responsive to the difference between the orientation of the tab of the control surface and the desired orientation of the tab of the control surface being within the tolerance, removing the elongate structure; and
   responsive to the difference between the orientation of the tab of the control surface and the desired orientation of the tab of the control surface being not within the tolerance, adjusting the tab of the control surface using the adjustment and repeating managing the position of the tab of the control surface.

* * * * *